US007771784B2

(12) United States Patent
Loutfy et al.

(10) Patent No.: US 7,771,784 B2
(45) Date of Patent: Aug. 10, 2010

(54) THIN FILM PRODUCTION METHOD AND APPARATUS

(75) Inventors: Raouf O. Loutfy, Tucson, AZ (US); Alexander P. Moravsky, Tucson, AZ (US); Charles N. Hassen, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 309 days.

(21) Appl. No.: 11/885,659

(22) PCT Filed: Mar. 10, 2006

(86) PCT No.: PCT/US2006/008622

§ 371 (c)(1),
(2), (4) Date: Apr. 18, 2008

(87) PCT Pub. No.: WO2006/099156

PCT Pub. Date: Sep. 21, 2006

(65) Prior Publication Data

US 2008/0308209 A1    Dec. 18, 2008

Related U.S. Application Data

(60) Provisional application No. 60/660,412, filed on Mar. 10, 2005.

(51) Int. Cl.
*B05D 7/00* (2006.01)
(52) U.S. Cl. ..................................................... 427/180
(58) Field of Classification Search .................. 427/180
See application file for complete search history.

(56) References Cited

U.S. PATENT DOCUMENTS

| | | | |
|---|---|---|---|
| 6,749,862 B2 | 6/2004 | Landers | |
| 6,824,689 B2 | 11/2004 | Wang et al. | |
| 6,835,591 B2 * | 12/2004 | Rueckes et al. | ............... 438/99 |
| 2003/0111946 A1 | 6/2003 | Talin et al. | |
| 2003/0147802 A1 | 8/2003 | Smalley et al. | |
| 2004/0109814 A1 * | 6/2004 | Simard et al. | ............ 423/447.1 |
| 2004/0166235 A1 | 8/2004 | Fuji et al. | |
| 2004/0197546 A1 | 10/2004 | Rinzler et al. | |
| 2005/0170089 A1 | 8/2005 | Lashmore et al. | |
| 2007/0036709 A1 | 2/2007 | Lashmore et al. | |

* cited by examiner

*Primary Examiner*—Frederick J Parker (57) ABSTRACT

A method for forming a thin film material which comprises depositing solid particles from a flowing suspension or aerosol onto a filter and next adhering the solid particles to a second substrate using an adhesive.

22 Claims, 7 Drawing Sheets

THIN FILM PRODUCTION METHOD AND APPARATUS

CROSS-REFERENCE TO RELATED APPLICATION

This application claims priority from U.S. Provisional Application Ser. No. 60/660,412 filed Mar. 10, 2005.

STATEMENT REGARDING FEDERALLY SPONSORED RESEARCH OR DEVELOPMENT

This invention was made in part with Government support under DOE Grant No. DE-FG03-01ER83281, 2002-2004, awarded by the Department of Energy. The Government may have certain rights in the invention.

BACKGROUND OF THE INVENTION

The invention described herein relates to the formation of films and materials so produced, and more particularly to the production of films of carbon nanotubes (CNTs).

An ideal nanotube can be thought of as a hexagonal network of carbon atoms, resembling chicken-wire, rolled up to make a seamless cylinder. Typically just a nanometer across, the cylinder can be tens of microns long, with each end "capped" with half a fullerene molecule. Single-wall nanotubes (SWNT) can be thought of as the fundamental cylindrical structure, and these form the building blocks of double-walled nanotubes (DWNT) and multi-walled nanotubes (MWNT), i.e., concentric cylinders of CNT, and the ordered arrays of CNT called ropes.

CNTs and ropes of CNTs are used for making electrical connectors in micro devices such as integrated circuits or in semiconductor chips used in computers because of the electrical conductivity and small size of the carbon nanotube. CNTs are also used as antennas at optical frequencies, and as probes for scanning probe microscopy such as are used in scanning tunneling microscopes (STM) and atomic force microscopes (AFM). In addition, CNTs are useful as electron field-emitters and as electrode materials, particularly in fuel cells and electrochemical applications such as Lithium ion batteries, and CNTs may be used in place of or in conjunction with carbon black in tires for motor vehicles. CNTs are also used as supports for catalysts used in industrial and chemical processes such as hydrogenation, reforming and cracking catalysts, as well as elements of composite materials providing novel mechanical, electrical and thermal conductivity properties to those materials.

Several approaches to the production of CNTs exist in the art. Fullerene tubes, i.e., CNTs, are, for example, produced using carbon arc production methods by which spheroidal fullerenes, i.e., Buckyballs, are produced from vaporized carbon. However, this method only produces multi-walled carbon nanotubes. In other methods, CNTs are produced in a DC arc discharge apparatus using both vaporized carbon and a transition metal from the anode of the arc discharge apparatus.

Another CNT production method, disclosed by PCT/US/98/04513 entitled "Carbon Fibers Formed From Single-Wall Carbon Nanotubes," produces SWNTs, nanotube ropes, nanotube fibers, and nanotube devices. This method utilizes a laser beam to vaporize material from a target comprising, consisting essentially of, or consisting of a mixture of carbon and one or more Group VI or Group VIII transition metals. The vapor from the target forms CNTs that are predominantly SWNTs. The method also produces significant amounts of SWNTs that are arranged as ropes, i.e., the SWNTs run parallel to each other.

Still another exemplary method of carbon nanotube production is disclosed by PCT US99/25702 entitled "Gas-phase process for production of single-wall carbon nanotubes from high pressure CO." The method comprises the process of supplying high pressure (e.g., 30 atmospheres) CO that has been preheated (e.g., to about 1000° C.) and a catalyst precursor gas (e.g., $Fe(CO)_5$) in CO that is kept below the catalyst precursor decomposition temperature to a mixing zone. In this mixing zone, the catalyst precursor is rapidly heated to a temperature that results in (1) precursor decomposition, (2) formation of active catalyst metal atom clusters of the appropriate size, and (3) favorable growth of SWNTs on the catalyst clusters. Preferably a catalyst cluster nucleation agency is employed to enable rapid reaction of the catalyst precursor gas to form many small, active catalyst particles instead of a few large, inactive ones. Such nucleation agencies can include auxiliary metal precursors that cluster more rapidly than the primary catalyst, or through provision of additional energy inputs, e.g., from a pulsed or CW laser, directed precisely at the region where cluster formation is desired. Under these conditions SWNTs nucleate and grow according to the Boudouard reaction. The SWNTs thus formed may be recovered directly or passed through a growth and annealing zone maintained at an elevated temperature, e.g., 1000° C., in which tubes may continue to grow and coalesce into ropes.

However, neither PCT/US98/04513 or PCT/US99/25702 provide simple processes for direct formation of thin films of CNTs.

There have been several basic approaches described in the prior art to adapt the CNT production methods discussed above so as to fabricate thin films from CNTs. Examples from the art are in-situ production methods and bulk production methods. In-situ production methods require growth of CNTs on a specially prepared substrate using a carbon vapor; while bulk production methods produce films by starting from a quantity of CNT powder that is then dispersed uniformly onto the target substrate.

In-situ production methods of CNT film have several disadvantages. First, the prepared substrate must be able to withstand high production temperatures, thereby limiting materials that may be used as the substrate. Second, the reactor used to grow the vapor on the prepared substrate must be large enough to house the substrate, which could be impractical for large device applications. Third, assuring the vapor is deposited on the prepared substrate uniformly is difficult, especially over large, complexly shaped or thermodynamically variable areas on the substrate. Finally, scale-up in production is costly for in situ production methods.

The prior art methods for the bulk production of CNT films have several additional problems. Namely, CNTs in bulk produced CNT films are randomly oriented. And, once the CNTs used to produce the films contact one another, they tend to combine to form clumps of tubes that stick together. Those clumps are difficult or impossible to separate from each other prior to dispersal for coating target substrates. Furthermore, some of the CNTs are lost due to inefficiencies in the methods of dispersal and adhesion to the target substrates. And, characteristics of products produced using bulk production methods are not suitable to forming thin films. For example, free-standing foils of CNT, known as "buckypaper," may be formed by filtration on polymer or other suitable filter material from a CNT sample dispersed in liquid. The "buckypaper" tends to exhibit brittle characteristics, and are therefore useful only for the production of thick CNT films. Furthermore, "buckypaper" formed, as described above, requires a secondary manufacturing step that uses a solvent or carrier solution such as alcohol. The secondary step adds labor costs and any solvent must be completely removed from the product. Also, self-supporting mats of CNT formed by deposition on non-porous substrates placed near the reaction chamber place numerous constraints on the design of the reactor and of the collection system, and even so, result in films that tend to show non-uniform physical properties, corresponding to non-uniform deposition of suspended CNT.

Filters also have been used as substrates for forming thin films, and general literature on filtering by use of belt filters is extensive, and includes both endless type belt filters (such as in U.S. Pat. No. 4,057,437) and supply rolls of filter medium which feed clean filter material through the system on a one-time basis, so that the filter medium moves from the supply spool to a take-up spool once the filter is loaded to its target maximum level (such as in U.S. Pat. No. 4,011,067). However, such prior art filtering systems do not provide a means to remove the accumulated filtered material leaving its uniform dispersion characteristics intact. Since orientation of the filtered material after its removal from the filter generally is not of concern to designers of filtration systems, prior art filters do not accommodate thin or thick film transfer procedures which preserve the as-deposited filtered material physical configuration.

In one prior art method that does seek to form thin films of CNTs on filters, the films are made by filtering a light aerosol, i.e., 0.005 g/ml, of nanotubes (such as those produced by the HiPco method of CVD production) suspended in air. Unfortunately, the filtration does not occur from the reactor exhaust directly, and there is no suggestion in the art to make the filtration a continuous process.

References to the use of adhesive substrates in the formation of CNT films are also limited in the prior art. In work described in R. Baughman et al, *Science*, 284, 1340 (1999), the authors disclose a method of constructing an actuator by attaching a layer of "buckypaper" to a piece of tacky adhesive tape. However, the buckypaper employed by Baughman was a thick film produced by post-processing of as-produced CNT. Second, no effort is made by Baughman to provide a means to remove the tacky adhesive tape, i.e., to produce a pure CNT structure. Another prior art reference, Chang et al. (U.S. Pat. No. 6,436,221), describes the application of adhesive tape to thin nanotube films formed from a CNT slurry and subsequent detachment of the tape to remove poorly attached CNTs. However, the purpose of the method taught by Chang et al. is to improve the quality (smoothness) of films left bonded to the original substrate, not to recover the nanotubes that adhere to the adhesive.

Thus, a need exists for a method that forms thin films of CNTs on arbitrary substrates more efficiently.

SUMMARY OF THE INVENTION

The instant invention provides a method for directly producing a layer of CNT material comprising the steps of forming a fluid suspension of a particulate at a high temperature; cooling the fluid from the high temperature zone to a lower temperature compatible with the allowable temperature range of a filter material; filtering the cooled fluid through a section of a filter medium made of said material for a time sufficient to produce a layer of the desired thickness of the suspended particulates; removing the section of filter material with the layer of particulate from the flow of the cooled fluid; and applying a layer of adhesive material to the layer of particulate. In certain cases, such as when the particulate constitutes a carbon nanotube film, adhesive properties of the deposited film may allow the film to be collected onto a substrate with no applied adhesive, such as in the case of an untreated metal foil or plastic film when the natural affinity of the nanotubes for the film exceeds the natural affinity of the nanotubes for the filter material.

A device for the fabrication of thin films based on the aforementioned method is also contemplated and comprises a fluid generator for forming a suspension of a particulate at a high temperature; a heat exchanger for cooling the fluid from the high temperature zone to a lower temperature; a filter medium for filtering the cooled fluid through a section of the filter medium made of said material for a time sufficient to produce a layer of the desired thickness of the suspended particulates; a transport system for removing the section of filter material with the layer of particulate from the flow of the cooled fluid; and an applicator for applying a layer of adhesive material to the layer of particulate.

BRIEF DESCRIPTION OF THE FIGURES

Further features and advantages of the invention will be seen from the following detailed description, taken in conjunction with the accompanying drawings, wherein like numerals depict like parts, and wherein.

DETAILED DESCRIPTION OF THE INVENTION

A detailed description of the preferred embodiment of the device for producing a CNT film on a substrate and a method of producing the same is described herein below.

Figure 1:
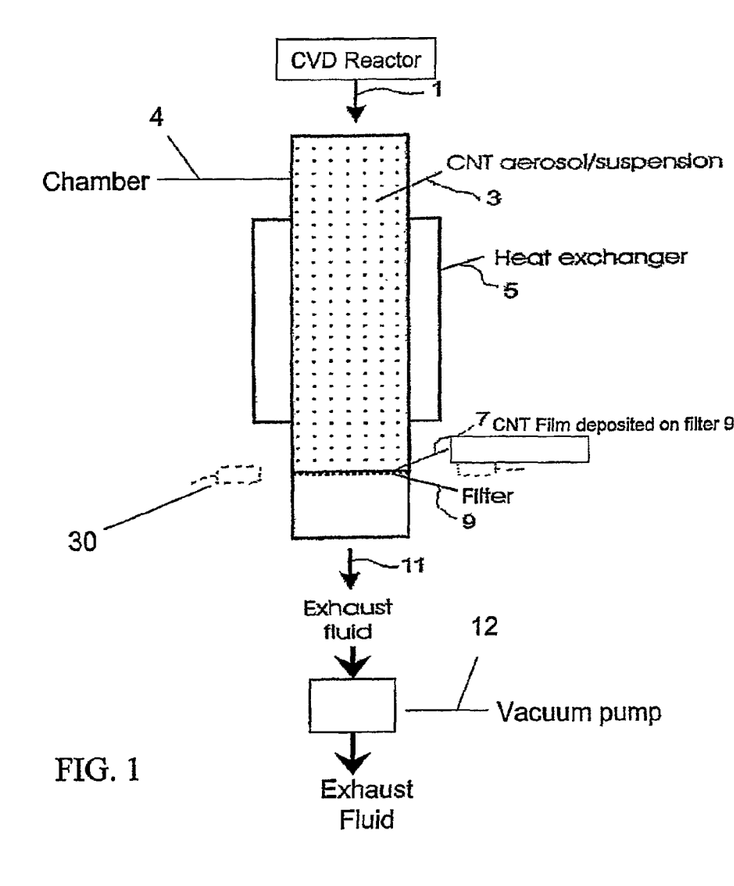
FIG. 1 shows a device that produces a film of CNT from the exhaust flow of a CVD reactor by means of a filter.

FIG. 1 describes a method and apparatus consistent with a first embodiment of the instant invention. Generally, in the present embodiment, an aerosol 3 comprising a fluid suspension of CNT particles, enters a chamber 4 of a heat exchanger 5 as it is emitted from a CVD reactor 1. The heat exchanger 5 may be of conventional design for cooling the aerosol 3 as it passes through the chamber 4. The CVD reactor 1 is of conventional construction. Accordingly, details of the CVD reactor are omitted. The aerosol 3 experiences a decrease in thermal energy as it passes through the chamber 4 of the heat exchanger 5 and is deposited on a filter substrate 9 in the downstream end of the heat exchanger 5 to form CNT film 7. An exhaust 11 is provided at the output end of the apparatus in the aerosol flow path, beyond the filter 9, to provide means for collecting or disposing of residual fluid consisting of the fluid component of the aerosol with particulates removed by the filter 9, and this residual fluid is finally output from the apparatus.

More particularly, exhaust flow from the reactor 1 (e.g., a CVD apparatus) produces an aerosol or suspension of CNT particles which may also include typical catalyst particulates employed to produce the CNT in the CVD reactor. The aerosol or suspension typically exits the reaction zone of the reactor at a temperature between 300° C. and 1400° C. Subsequently the heat exchanger 5 reduces the temperature of the CNT aerosol or suspension 3 in the chamber 4 to a temperature low enough to prevent any damage or malfunction of the filter 9. This allows the use of low-cost flexible filter elements, such as polymeric cloth filters. A pressure differential across the filter 9 may depend on positive pressure from the reactor side, such as would result from the flow of feedstock gas into the reactor; or on negative pressure from the exhaust side, such as would result from a vacuum pump 12, shown schematically, on the exhaust 11. In this embodiment, the film 9 is a felt-like mesh formed of low-density CNT, which builds up uniformly on the filter, with the resultant film thickness dependent upon the reactor production rate, the active filter area, and the duration of the exposure of the filter to the process output.

Although the above description of FIG. 1 shows a CVD reactor which can be used to make SWNT, DWNT or MWNT, other types of reactors known in the art may be substituted for the CVD reactor and still provide a suspension that may be used to produce carbon mats as conceived in this invention. Therefore the reader should understand that the CVD reactor shown in FIG. 1 and subsequent Figures, could be replaced by any reactor whose output is a hot exhaust gas with an entrained aerosol suspension of CNT or other micro-tubular particles. Further, although one would not necessarily produce a carbon mat with identical morphology, one could also begin with bulk nanotube powders manufactured separately, and then by some means, such as using a surfactant and sonication, or vortex mixers (for CNT powders into a liquid); or rotary mixers or sifters or gas vortex mixers (for powders into gas phase), create a uniform dispersion of nanotubes in a fluid stream which might be a liquid or an aerosol suspension. In these cases it would not be necessary to have a heat exchanger in the apparatus.

Figure 2:
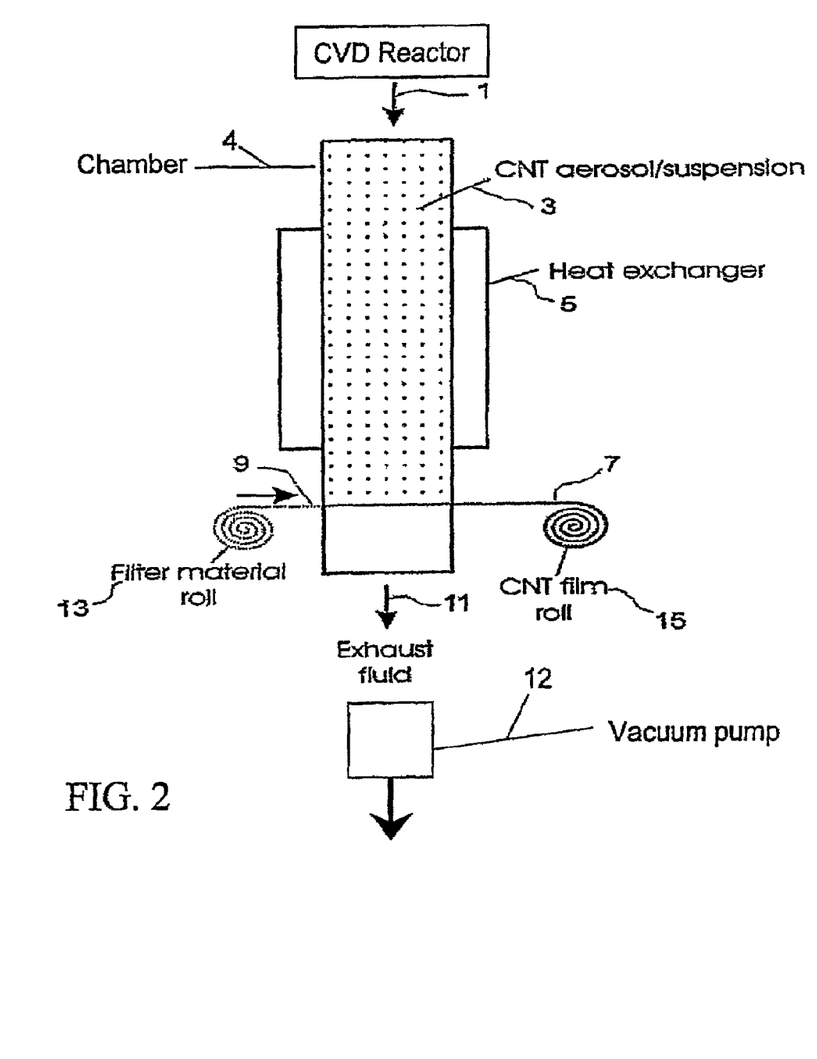
FIG. 2 shows an apparatus and method consistent with a second embodiment of the invention.

FIG. 2 describes another embodiment of a device consistent with the instant invention. Like the first embodiment, in the second embodiment of the invention an aerosol 3, as described in reference to FIG. 1, enters the chamber 4 of a heat exchanger 5 from the output of a CVD reactor 1. The aerosol 3 experiences a decrease in thermal energy as it passes through the heat exchanger 5 and is deposited on a filter substrate 9 to form CNT film 7. As described before, in reference to FIG. 1, the exhaust 11, comprising the fluid component of the aerosol is outputted from the apparatus. However, in the second embodiment of the invention, the filter substrate 9 is formed on a wound filter material roll 13. The filter substrate 9 moves underneath an aperture (not shown) downstream of the heat exchanger 5 so that CNT aerosol 3 can be directly deposited. The newly formed CNT film 7 is then wound around a CNT film roll 15. The filter material roll 13 and the CNT film roll 15 forms a transport mechanism that enables filter substrate 9 to continuously move underneath the output aperture of the chamber 4 of the heat exchanger 5 thereby exposing fresh filter material to a continuous stream of CNT aerosol 3. The thickness of the CNT film can be varied by adjusting either the transport rate of the filter substrate 9, or the outflow of the reactor 1 or both.

A third embodiment of the invention is described with reference to FIG. 3. The apparatus of the third embodiment includes all of the features of the first embodiment and second embodiments with the additional feature of a cover material 17 for the CNT film 7 deposited on the filter substrate 9. The cover material 17 which comprises an elongate film or tape having a layer of adhesive (if needed to achieve attachment greater than that provided by natural affinity of the deposited film), paraffin wax or a low melting point metal heated to near its melting point, so that it can bond to the CNT film 7 is fed from a roll 18. Alternatively, the cover material 17 may comprise backed polymer or resin sheets made tacky by heat or chemical processes, pre-impregnated carbon-carbon composite cloth or adhesive tape, a carbon slurry, a sugar, tar, a green ceramic, wax, a polymer or a composite made from a combination thereof. Optionally, the adhesive coated cover material 17 may be patterned, e.g., grooved, to orient the CNTs on the substrate 9. In use, the cover material 17 is brought in contact with the CNT film 7, and the CNT film 7 is then wound around a roller. In this latter embodiment, the transportation system that moves the filter material 9 may include a roller for the filter material roll 13 and a roller for a covered CNT film roll 19.

Figure 3:
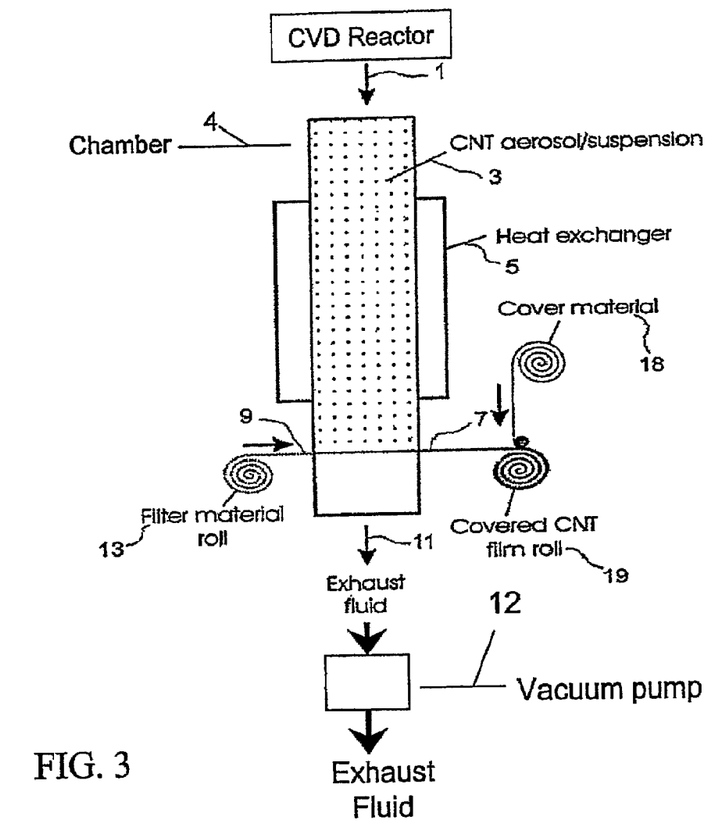
FIG. 3 shows an apparatus and method consistent with a third embodiment of the invention.

The purpose of the cover material 17 in the third embodiment of FIG. 3 is to form an adherent substrate for the CNT film. However, the filter material 9 is not removed from the CNT film 7 at the time of application of the cover material 17, but is instead wound around a covered CNT film roller 19. Thus, both the cover material 17 and the filter material 7 may be kept together to produce efficiently a safe means of transport of the CNT film to its final destination. However, the output of the apparatus and method of the third embodiment need not necessarily be a continuous roll, but might instead be pieces of adherent substrate 17 with the attached CNT film 7 cut to fit a specified shape needed for some other process or product.

Figure 4:
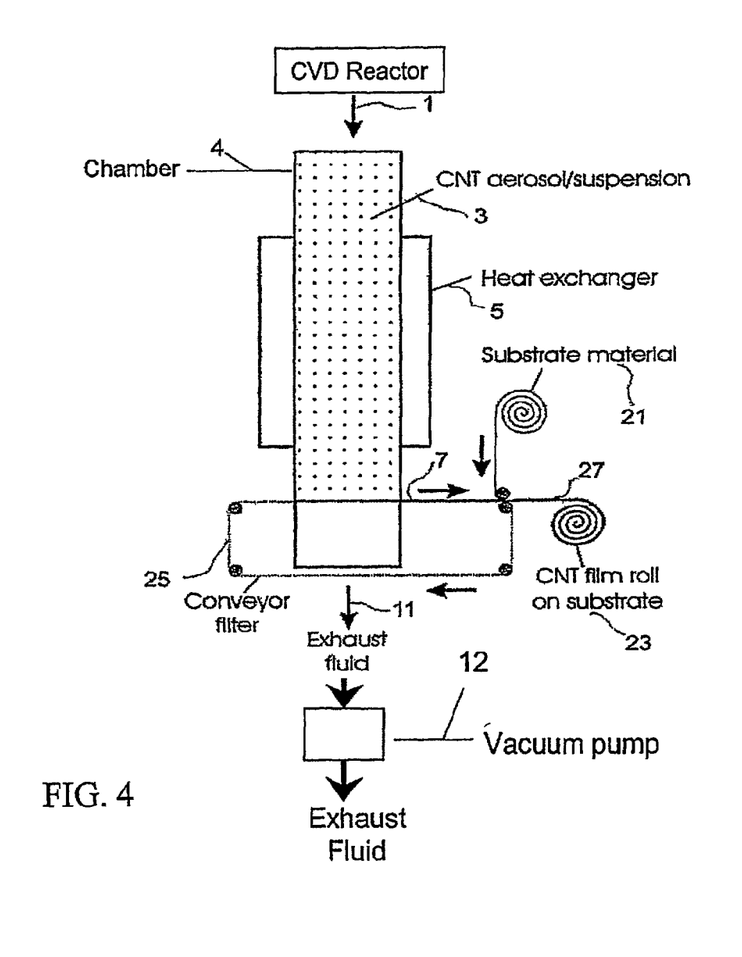
FIG. 4 shows an apparatus and method consistent with the fourth embodiment of the present invention.

The fourth embodiment will be discussed with reference to FIG. 4. The method and apparatus of the fourth embodiment utilizes a CVD reactor 1, the CNT aerosol 3, the heat exchanger 5 including the chamber 4 and exhaust 11 as in the first through third embodiments. However, instead of a filter material formed on a roll, the filter material of the fourth embodiment is in the form of a continuous conveyor belt 25 that is moved in a loop underneath the output aperture of the chamber 4 of the of the heat exchanger. The CNT aerosol 3 is deposited on the conveyor belt 25 similarly to the deposition on the filter 9 in respect to the above-described embodiments to form the CNT film 7. Once the CNT film 7 is formed, an adhesive-coated cover material 21 is brought into contact with the CNT film 7, whereupon the CNT film is taken up from the conveyor belt 25, and transferred to the substrate material 21. As described before in reference to FIG. 3, the adhesive-coated cover material may either be a layer of tacky material on a backing material or other substrate. After the CNT film 7 is transferred to the substrate material 21, the conveyor belt 25 is peeled away leaving the CNT film on the substrate 21. The CNT film carrying substrate 21 is then wound on a roll 23. Optionally, the then exposed surface of the CNT film 7 may be coated, e.g., with second adhesive material to further stabilize the film.

If necessary the negative image of the pattern of CNT film remaining on the conveyor belt 25 may be removed by mechanical means such as scraping or blowing. Alternatively, if the negative image forms a pattern that is useful, that negative image may then be lifted intact from the belt by application of a second, unpatterned, adhesive substrate to form a second patterned film.

Figure 5:
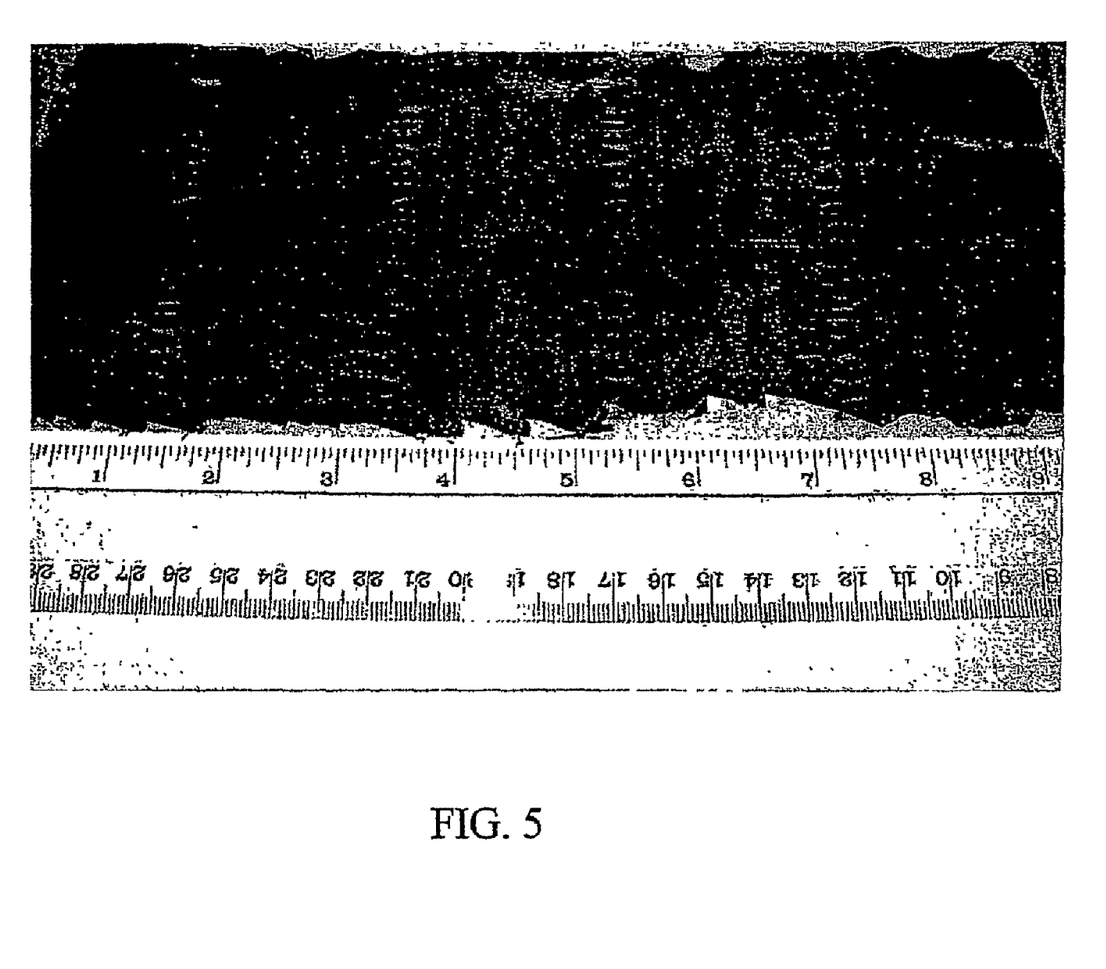
FIG. 5 shows a film that consists of as-produced carbon nanotubes adhered to a piece of paraffin.

FIG. 5 is a photograph of CNT adhered to a thin film of Parafilm brand paraffin made in accordance with the present invention as described in reference to FIG. 3.

Figure 6:
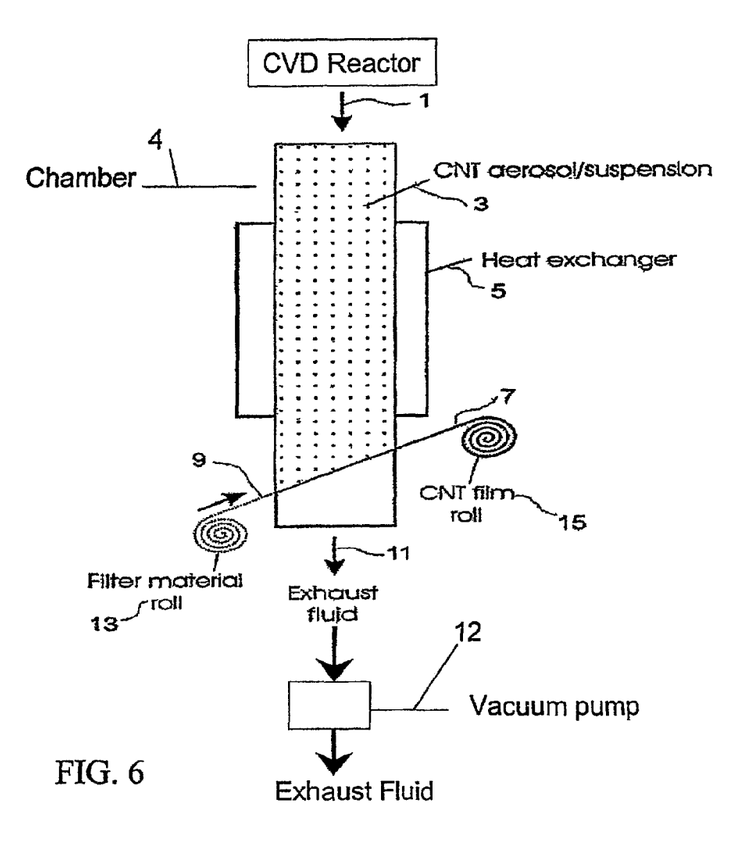
FIG. 6 shows a schematic of a system similar to that in FIG. 3, with the added feature of a filter medium that slants steeply away from the direction of flow of the aerosol-containing fluid, causing a partial alignment of fibers in the aerosol.
Figure 7:
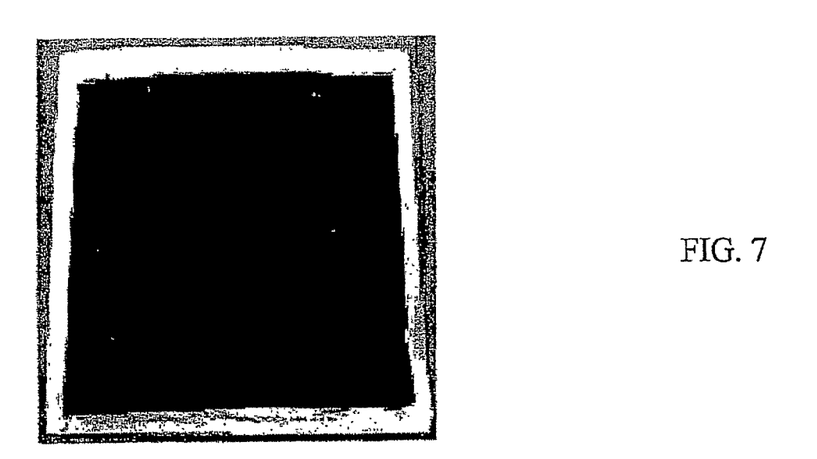
FIG. 7 is a photograph showing the as-produced DWNT particles adhered to an aluminum foil substrate.
Figure 8:
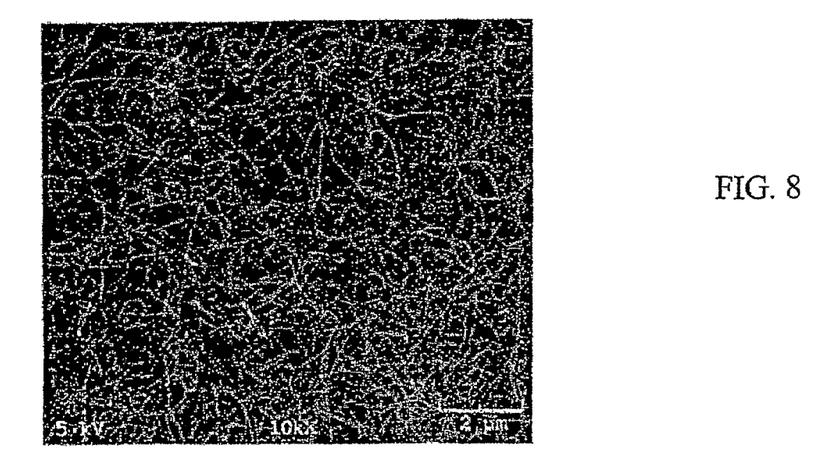
FIG. 8 is an SEM photo of the adherent mesh on the aluminum substrate.

Generally, CNT film made according to the above described embodiments is partially aligned, since the CNT tubes tend to form a layer that is randomly oriented within the filter plane, but that essentially lies flat within that plane. For many purposes, such as conduction of heat and electricity, the films made in this way are sufficiently aligned as-produced. However, adjusting the filter angle from perpendicular to the flow of CNT aerosol 3, emitted from the output of the chamber 4 of the heat exchanger 5, i.e., as shown in FIG. 6 causes the flow velocity of CNT aerosol 3 as deposited on the filter 9 to have at least one vector where the velocity is significantly greater. This causes the CNTs of the filter 7 to align on the filter 9 in a direction parallel to the direction of the greatest flow velocity. This difference in flow velocity results in significant alignment of the CNT's on the filter 7 as they are deposited.

Also, it is possible to further align the nanotubes so that they lie mostly parallel to one another in the plane of alignment by use of electrical and/or magnetic fields (shown schematically in phantom at 30 in FIG. 1) established in the filter collection region of the apparatus.

The CNT film made in accordance with the present invention may be extruded and/or folded to a desired number of layers and/or degree of axial stretch of the CNT film. Such approaches can provide arbitrarily uniform distribution of CNTs throughout the volume of the CNT film, and the mechanical shearing forces of extrusion may be employed to modify the alignment of CNTs in the CNT film. The CNT film may also be formed into a composite material of suspension performance and properties.

Surprisingly, films of carbon nanotubes made by this technique exhibit an area-wide adherent property that makes the intact removal of as-produced films from an original substrate possible with almost any material, including untreated metals, plastics, and glass. Therefore, all of the embodiments described herein may substitute the inherent adherent property of the nanotube film in place of an added adhesive on the collecting substrate.

Another unique embodiment of this invention is production of a composite film structure made by coating a film produced by the instant invention with a layer of metal using an RF metal evaporation system, for example. Because of the very low density of the deposited films, it is practical to fully coat individual bundles of nanotubes, with the depth of such metal coating into the nanotube film controllable over a useful range of thicknesses. Such films may have uncoated nanotubes on one face, and fully metal coated tubes on the other face. This can greatly simplify establishing good electrical contact with tubes in the films, and can also be used to make a kind of "nanoadhesive" tape or film.

EXAMPLE 1

The output from a CVD reactor comprising a hot exhaust gas flow with entrained DWNT particles was deposited on a canister filter element comprising a stainless steel woven mesh. The output from the reactor (35 mg/hr of DWNT particles) was allowed to deposit DWNT for a period of 30 minutes. The coating deposited on the canister filter element was then transferred to an aluminum foil substrate which exhibits a higher natural affinity for the DWNT mat than the stainless steel woven mesh canister filter element. The transfer was made by applying a uniform pressure through the aluminum foil to the film initially adherent to the canister filter. This was then carefully unrolled from the canister to produce the aluminum foil substrate coated with a layer of DWNT approximately 0.7 microns thick (see FIG. 7). A high-resolution scanning electron microscope was then used to produce the image (FIG. 8), showing the densely entangled structure of the DWNT mesh.

The present invention has advantages in that the process may be run continuously, and the CNT film may be produced directly, i.e., without stopping or handling the film. Also, the CNT film produced is of lower density than prior art films.

Various changes may be made without departing from the spirit and the scope of the invention.

What is claimed is:

1. A method for directly forming a thin film of nanotubes from a flowing aerosol suspension of nanotube particles produced as the exhaust flow from a nanotube-producing reactor, which comprises:

depositing said nanotube particles from said flowing aerosol suspension onto a filter substrate; and adhering the as-deposited nanotube particles to a second substrate.

2. The method of claim 1, wherein the second substrate comprises an adhesive coated substrate.

3. The method of claim 2, wherein the adhesive comprises an organic material.

4. The method of claim 1, including the step of covering the deposited nanotube particles.

5. The method of claim 4, wherein the deposited nanotube particles are covered by a film.

6. The method of claim 1, wherein the deposited nanotube particles are separated from the filter substrate while preserving the physical orientation of the as-deposited particles.

7. The method of claim 2, wherein the adhesive material is applied to the second substrate in a predetermined pattern so that the deposited particles attach to the second substrate in said predetermined pattern.

8. The method of claim 1, wherein the filter substrate comprises a porous filter medium.

9. The method of claim 1, including the step of orienting said particles by applying a magnetic field to the particles in a region where the particles are deposited upon the filter substrate.

10. The method of claim 1, including the step of orienting said particles by the step of applying an electrical field to the particles in a region where the particles are deposited upon the filter substrate.

11. The method of claim 1, wherein the nanotube particles comprise carbon nanotubes.

12. The method of claim 11, wherein the carbon nanotubes are formed in a CVD reactor.

13. The method of claim 2, wherein the adhesive is selected from the group consisting of a wax, a tar, a polymer, a green ceramic, a carbon slurry, a sugar, and a combination of two or more thereof.

14. The method of claim 1, wherein the nanotube particles are adhered to the second substrate by natural affinity.

15. The method of claim 11, wherein the carbon nanotubes are formed in a plasma jet reactor.

16. The method of claim 3, wherein the adhesive comprises paraffin.

17. The method of claim 1, carried out as a continuous process.

18. The method of claim 1, including the step of passing said flowing aerosol suspension through a heat exchanger to cool said flowing aerosol suspension to a temperature compatible with the allowable temperature range of said filter substrate prior to depositing the particles upon the filter substrate.

19. The method of claim 17, wherein the nanotube particles are deposited on a moving filter substrate.

20. The method of claim 19, wherein the moving filter substrate comprises a porous belt.

21. The method of claim 19, wherein the moving filter substrate is oriented at an angle substantially normal to the flow of said aerosol suspension.

22. The method of claim 19, wherein the moving filter substrate is oriented at a non-normal angle to the flow of said aerosol suspension, whereby the nanotube particles are caused to be aligned as they are deposited on the filter substrate.

* * * * *